(12) United States Patent
Cho et al.

(10) Patent No.: US 8,422,028 B2
(45) Date of Patent: Apr. 16, 2013

(54) SCANNING MICROSCOPE USING AN I/Q-INTERFEROMETER

(75) Inventors: Kyu-Man Cho, Seoul (KR); Kang-Hyuk Kwon, Seoul (KR)

(73) Assignee: Industry-University Cooperation Foundation Sogang University (KR)

( * ) Notice: Subject to any disclaimer, the term of this patent is extended or adjusted under 35 U.S.C. 154(b) by 211 days.

(21) Appl. No.: 12/829,568

(22) Filed: Jul. 2, 2010

(65) Prior Publication Data
US 2010/0290061 A1  Nov. 18, 2010

Related U.S. Application Data

(63) Continuation-in-part of application No. PCT/KR2008/000672, filed on Feb. 4, 2008.

(30) Foreign Application Priority Data

Jan. 3, 2008 (KR) ........................ 10-2008-0000834

(51) Int. Cl.
*G01B 11/02* (2006.01)
(52) U.S. Cl.
USPC ........................................................ 356/511
(58) Field of Classification Search .................. 356/489, 356/486, 493, 495, 500, 511–515
See application file for complete search history.

(56) References Cited

U.S. PATENT DOCUMENTS

| | | | |
|---|---|---|---|
| 4,818,110 A * | 4/1989 | Davidson | ...................... 356/512 |
| 5,499,100 A | 3/1996 | Tanaka | |
| 5,598,265 A | 1/1997 | de Groot | |
| 5,994,691 A | 11/1999 | Konada | |
| 6,437,910 B1 | 8/2002 | Watanabe | |
| 7,298,496 B2 * | 11/2007 | Hill | ............................... 356/512 |

FOREIGN PATENT DOCUMENTS

WO  94/00733  1/1994

OTHER PUBLICATIONS

J. Moon, "A Novel, Hybrid Sensor for a Precision, Wide Dynamic Range Measurement of Displacement Using a Heterodyne I/Q Interferometer Scheme," COOC 2003, vol. 10, No. 1, May 14-16, 2003, pp. 685-686.

(Continued)

*Primary Examiner* — Tarifur Chowdhury
*Assistant Examiner* — Jonathon Cook
(74) *Attorney, Agent, or Firm* — Cantor Colburn LLP

(57) ABSTRACT

The present invention relates to a scanning microscope using an I/Q-interferometer. The scanning microscope includes an I/Q-interferometer which demodulates the phase change and amplitude change induced on the probe beam to provide the I- and Q-signals, an XY scanner, a scanner driver, a precision motion stage controlling the displacement of the sample along the direction parallel to the direction of the probe beam, a motion stage driver, a focusing/collimating device, and a computer. The computer transfers control commands to the scanner driver for scanning the XY scanner, receives I- and Q-signal provided from the I/Q-interferometer, processes the I- and Q-signal to obtain the corresponding phase and amplitude values at each scanning point, calculates error signal for maintaining constant phase during the scanning, and transfers commands to the motion stage driver for the precision motion stage to compensate for phase changes caused by surface morphology during the scanning.

The scanning microscope performs a multilayer scanning or a constant phase scanning to extract information for the surface or inside of the sample.

6 Claims, 6 Drawing Sheets

OTHER PUBLICATIONS

Jaeyong Lee et al., "Optical Heterodyne Scanning Microinterferometry for Optical Field Characterixation in Micro-Optic Components," Optical Society of Korea Summer Meeting 2004, Jul. 8-9, 2004, pp. 76-77.

Heeseong Jeong et al., "Complete mapping of complex reflection coefficient of a surface using a scanning homodyne multiport interferometer," Optics Communication, vol. 204, 2002, pp. 45-52.

* cited by examiner

SCANNING MICROSCOPE USING AN I/Q-INTERFEROMETER

FIELD OF THE INVENTION

The present invention relates to a scanning microscope using an I/Q-interferometer, and more particularly, to a scanning microscope which is capable of obtaining and analyzing physical and material information for a surface or inside of a sample by applying either a constant phase scanning method or a multilayer scanning method to a scanning I/Q-interferometer.

DESCRIPTION OF THE RELATED ART

An interferometric measuring system is a system that combines a probe beam and a reference beam by using a beam splitter (BS) and measures the intensities of two output beams from the corresponding output ports of the BS by using two separate photodetectors. From now on, the output electric signal from each photodetector will be referred to as an electrical signal. When the probe beam and the reference beam have the same frequency, the system is referred to as a homodyne interferometer and the system is referred as a heterodyne interferometer when the frequencies of the probe beam and the reference beam are different.

In the case of a homodyne interferometer, the intensities of the output beams from the BS vary corresponding to the phase difference between the probe beam and the reference beam. Since the intensity must be conserved, if a constructive interference occurs in one of the two output beams, then a destructive interference must occur in the other beam. Output signals from the BS are 180 degrees out of phase and therefore, when the two electrical signals are subtracted by a differential amplifier, correlated noises on the respective electrical signals are rejected and the interference signals are doubled, thereby increasing the signal to noise ratio. This measuring technique is called as a balanced detection method. The output signal from the differential amplifier is expressed by the mathematical equation 1

$$v_{diff} = R\sqrt{I_S}\sqrt{I_{LO}}\cos(\Phi_0 + \Phi_m),\quad \text{[Mathematical Equation 1]}$$

where $I_s$ and $I_{LO}$ represent, respectively, the intensities of the probe beam and reference beam, and $\phi_m$ represent a phase value induced in the probe beam due to geometrical structure and/or refractive index of a sample and $\phi_0$ represent the phase difference due to the different optical paths of the probe beam and the reference beam in the interferometer.

A scanning microscope using a conventional interferometer optimally measures a variation of the induced phase resulted from the structural change of a sample during the scanning process and therefrom obtain an image of the topographical structure of the surface or inside structure of the sample. Therefore, it is necessary to optimally measure $\phi_m$ while scanning the sample or the probe beam. Since the magnitude of $\phi_m$ is very small in most cases, the mathematical equation 1 can be rewritten as the mathematical equation 2, if the path length difference between the probe beam and the reference beam is kept at constant value by using a feedback control so that $\phi_0$ is always $n(2n+1)/2$, wherein $n=0, 1, 2, \ldots$.

$$v_{diff} = R\sqrt{I_S}\sqrt{I_{LO}}\sin\Phi_m + R\sqrt{I_S}\sqrt{I_{LO}}\Phi_m \quad \text{[Mathematical Equation 2]}$$

Therefore, a magnitude of an interference signal is proportional to $\phi_m$ and it is thus possible to map the local phase variations of the sample through scanning. However, when the intensity and phase of the probe beam vary at the same time, i.e. in the case that geometrical structure and material of the surface are changed at the same time, it is clear from mathematical equation 2 that these changes cannot be identified. This indistinguishability is a major drawback of the scanning microscope using a conventional interferometer and puts limitations on applications of the microscopy.

In the case of the heterodyne interferometer, the output electrical signal from the balanced detector can be represented by mathematical equation 3, $$v_{diff} = R\sqrt{I_S}\sqrt{I_{LO}}\cos(\Delta\omega t+\Phi_0+\Phi_m),$$

where $\Delta\omega$ represents the frequency difference between the probe beam and the reference beam. In other words, the interference signal is a heterodyne beat signal between the probe and the reference beam. Since the signal frequency is in RF or microwave band, typical RF signal processing technique can be used to measure phase change or amplitude change induced on the probe beam.

Various interferometer schemes which can simultaneously measure the phase change and the amplitude change induced on the probe beam have been developed by the present inventors' team. They showed that a homodyne I/Q interferometer consists of two identical interferometers in which two reference beams propagating along the identical path but have 90° phase difference, which can be constructed by manipulating the state of polarization, and thereby making the resulting interference signals from these two interferometers 90 degrees out of phase. Therefore, if the output signal from one interferometer is represented by the mathematical equation 4, $$v_I = \frac{R}{2}\sqrt{I_0}\sqrt{I_{LO}}\cos(\Phi_0+\Phi_m) \quad \text{[Mathematical Equation 4]}$$

then the output signal from the other interferometer is represented by the mathematical equation 5.

$$v_Q = \frac{R}{2}\sqrt{I_0}\sqrt{I_{LO}}\sin(\Phi_0+\Phi_m) \quad \text{[Mathematical Equation 5]}$$

The signals given by mathematical equations 4 and 5 are referred to as the in-phase signal and quadrature-phase signal or, simply, I-signal and Q-signal, respectively. The phase difference between the probe beam and the reference is given by mathematical equation 6, $$\Phi_0 + \Phi_m = \tan^{-1}\frac{v_Q}{v_I} \quad \text{[Mathematical Equation 6]}$$

and the amplitude of the probe beam can be given by mathematical equation 7.

$$\sqrt{I_0}\sqrt{I_{LO}} = \sqrt{v_I^2 + v_Q^2} \quad \text{[Mathematical Equation 7]}$$

Therefore, the phase and the amplitude changes induced on the probe beam can be measured simultaneously by using the I/Q-interferometer. It should be emphasized from the mathematical equation 6, that the value given in mathematical equation 6 is an absolute phase value. Therefore, it does not require any calibration process to convert measured electrical signal to the corresponding phase value, which is another significant advantage of using an I/Q-interferometer for scanning microscopy, because conventional interferometers require a rigorous calibration processes. Details of the homodyne I/Q-interferometer and the scanning surface microscope are disclosed in reference document 1 (Heseong Jeong, Jong-Hoi Kim, and Kyuman Cho, "Complete mapping of complex reflection coefficient of a surface using a scanning homodyne multiport interferometer.", Optics communication, Vol. 204, pp. 45-52 (2002)). In this paper, the authors have shown that the homodyne I/Q-interferometer can be used for analyzing the structural and material properties of a sample under test. The phase and amplitude of the probe beam reflected from the surface were measured by using the homodyne I/Q-interferometer and the complete maps of the local phase values and amplitude values are obtained by scanning the sample, where, by processing the data, material and structural defects can be identified. FIG. 6 is an experimental arrangement of a Multiport coherent optical detector which is disclosed in the reference document 1. In the FIG. 6, a homodyne I/Q-interferometer is disclosed. In the FIG. 6, OI means an optical isolator, BS means a beam splitter, DA means a differential amplifier, A/D means an Analog-to-digital converter, SM means a stepping motor, M means a mirror and PC means a personal computer.

The homodyne I/Q-interferometer requires a more complicated optical arrangement than that of the conventional homodyne interferometer; it consists of three polarizing beam splitters and four photodetectors. Therefore, the correct operation of the interferometer requires a very difficult and precise alignment process. A new heterodyne interferometer scheme, which can simultaneously measure the phase and amplitude change in the probe beam, has been proposed by the present inventors' team. The phase and amplitude changes carried by the heterodyne beat signal were demodulated by using an I/Q-demodulation technique, which is a standard demodulation technique in RF communications. Since the I/Q-demodulation is performed in the RF domain, the same optical arrangement as that of a conventional heterodyne interferometer can be used, which is much simpler than that of the homodyne I/Q-interferometer. The heterodyne I/Q-interferometer scheme has been used for a high sensitivity displacement sensor application, and the result is disclosed in reference document 2 (Joon Moon, Heseong Jeong, and Kyuman Cho, "A novel, hybrid sensor for a precision, wide dynamic range measurement of displacement sensor using a heterodyne I/Q interferometer scheme", Proceedings of the 10$^{th}$ Conference on Optoelectronics and Optical Communications, Vol 10, 685 (2003)).

As described above, the scanning microscope using the I/Q-interferometer can simultaneously map the local phase and amplitude variations induced in the probe beam reflected from the surface or inside of the sample or transmitted through the sample. However, since there are various reasons which result in both the amplitude and the phase change during the scanning procedure, it is difficult to obtain the true structure of the sample under test. For example, while the probe beam is scanning from one position to the other, say the position 1 and 2, respectively, if there is a depth change and the focus of the probe beam is located at the position 1, then both the phase and amplitude change simultaneously. The phase and the amplitude are also subjected to change if there is a material inhomogeneity between the position 1 and 2. The former and the latter cases cannot be distinguished in an archetypal scanning arrangement.

The present invention suggests new scanning methods in the scanning I/Q-interferometric microscope utilizing a constant phase scanning method or multi-layer scanning method which can provide more precise information about the true structure and/or material inhomogeneity of the surface or inside of the sample under test.

Throughout this application, several patents and publications are referenced and citations are provided in parentheses. The disclosure of these patents and publications is incorporated into this application in order to more fully describe this invention and the state of the art to which this invention pertains.

DETAILED DESCRIPTION OF THIS INVENTION

Therefore, an object of the present invention is to provide a scanning microscope which is capable of measuring true phase and amplitude variations induced on the probe beam transmitted through or reflected from a sample by applying multilayer or constant phase scanning methods to an I/Q interferometer.

To achieve the above and other objects, a scanning microscope according to an aspect of the present invention includes: an I/Q-interferometer, from which a probe beam is coupled out, to which a reflected beam from a surface or transmitted beam through a sample is coupled back, in which I/Q-demodulation on interference signals are performed, and by which I- and Q-signals are obtained; an XY scanner scanning the sample in two directions perpendicular to a propagation direction of the probe beam; a scanner driver actuating the XY scanner; a precision motion stage controlling the displacement of the sample along the direction parallel to the direction of the probe beam; a motion stage driver actuating the precision motion stage; a focusing device focusing the probe beam from the I/Q interferometer onto a surface or inside of the sample; a collimating device collimating the probe beam reflected from or transmitted through the sample; and a computer transferring control commands to the scanner driver for moving XY scanner from one scanning point to the next scanning point in a direction perpendicular to the propagation direction of the probe beam, receiving, storing, and processing the I- and Q-signals, demodulating phase and amplitude changes induced on the probe beam. The computer measures phase change in each scanning point, calculates an error signal for a feedback control for a constant phase scanning, transfers commands to the motion stage driver for the precision motion stage to compensate for height changes during the constant phase scanning, obtains true morphology of the sample from the error signal, and obtains a map of material inhomogeneity from amplitude measurements.

The scanning microscope is operated in either the back reflection geometry or the transmission geometry. In the back reflection geometry, the probe beam is focused onto a sample by using a focusing device, which may be a single focusing lens or set of lenses such as a microscope objective lens, and the reflected probe beam from the sample is recollimated by the same focusing device. In the transmission arrangement, the probe beam is focused to the sample by using a focusing device and the transmitted probe beam from the sample is collimated by using a collimating device. The collimated probe beam is then sent back to the interferometer by use of at least one folding mirror.

A scanning microscope according to an aspect of the present invention can be operated in either the constant phase scanning method or the multilayer scanning method. The constant phase scanning method can be applied for a back reflection geometry in which, while the sample is scanning in the XY-direction, the probe beam is focused onto the surface of a sample and the phase and amplitude changes of the reflected beam are measured, while the multilayer scanning method can be applied for both a reflection and a transmission geometry.

In the constant phase scanning method, while XY-scanning stages are scanning the surface, measured phase values are used for acquiring the error signal for the feedback control. A proportional-integral (PI) operation or a PI-differential (PID) operation is performed in the computer and the error signal is used for controlling the height of the surface in the Z-axis. Since the phase of the probe beam is given by the roundtrip distance of the probe beam, the feedback control for maintaining constant phase keeps the location of the reflection on the surface at the constant position while scanning the sample in XY-direction and, thereby, the error signal for the feedback control in each scanning point represents the topography of the surface at the scanning point. The error signals are stored in the computer and used for imaging the topography of the surface. Since the roundtrip path length of the probe beam is kept at the constant value, if the focal plane is initially located at the surface of the sample, then the location of the focal plane remains at the surface while scanning the surface. Therefore, amplitude of the probe beam should not change unless there is a material inhomogeneity. Therefore, true surface topography and material inhomogeneity can be imaged by using this new scanning method. It is a great improvement over the conventional scanning method because, as mentioned earlier, amplitude of the probe beam is subject to change if the height of the reflecting surface changes.

In the multi-layer scanning method, the sample is pushed down or pulled up step by step with a prescribed step size. Scanning measurements in XY-direction are performed in each step and the Z-position of the surface is kept at the constant value while completing one layer XY-scanning. A true surface morphology and material inhomogeneity can be mapped by processing the multilayer measurement results.

According to the scanning I/Q-interferometer and scanning methods described above, a true morphology and material inhomogetneity of a surface can be imaged independently by using the constant phase scanning method, while local variations of the real and imaginary parts of complex refractive indices of the inside of a inhomogeneous sample can be mapped independently by using the multilayer scanning method. Therefore, the scanning microscope operating with either the constant phase or the multilayer scanning arrangement may be a potential high resolution microscope for quantitative diagnostics of compound structures such as bio and semiconductor materials and devices.

The present invention will now be described in further detail by examples. It would be obvious to those skilled in the art that these examples are intended to be more concretely illustrative and the scope of the present invention as set forth in the appended claims is not limited to or by the examples.

EXAMPLES

First Embodiment

Reference will now be made in detail to a first embodiment of the present invention, examples of which are illustrated in the accompanying drawings.

Figure 1:
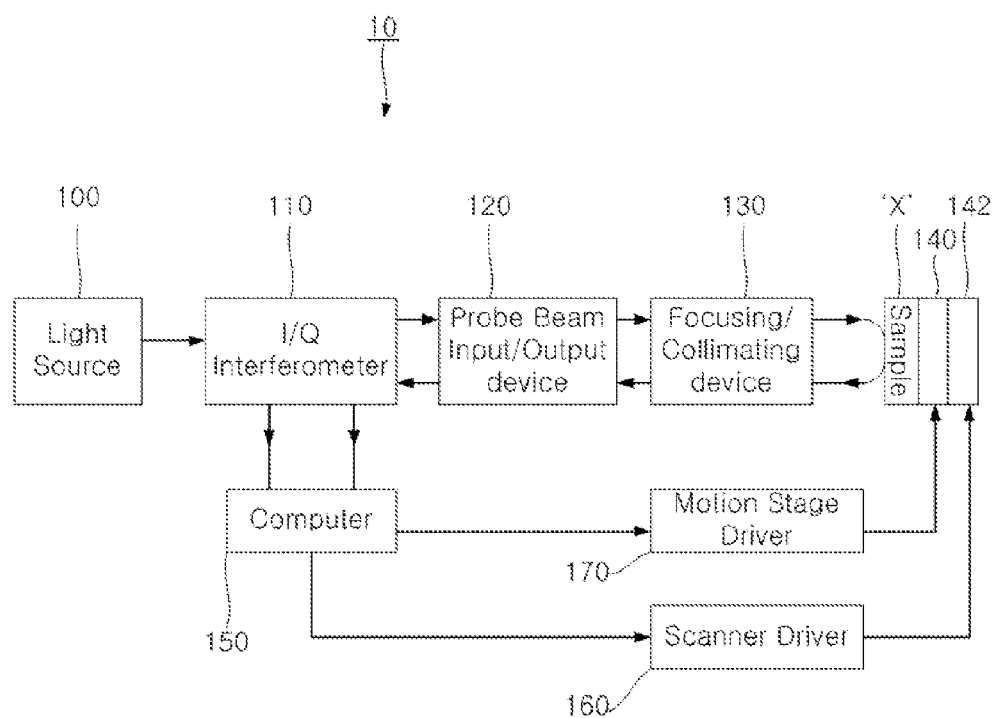
FIG. 1 is an overall block diagram showing a scanning microscope using an I/Q-interferometer according to the present invention.

FIG. 1 is an overall block diagram illustrating a scanning microscope according to the present invention. Referring to FIG. 1, the scanning microscope 10 according to the present invention is provided with a light source 100, an I/Q-interferometer 110, a probe beam input/output device 120, a focusing/collimating device 130, a precision motion stage for Z-axis adjustment 140, an XY scanner 142, a computer 150, a scanner driver 160 and a motion stage driver for Z-axis adjustment 170. By employing the constant phase scanning or multilayer scanning method for a scanning microscope using an I/Q-interferometer, the scanning microscope 10 according to the present invention having the aforementioned configuration can measure a true morphology and material in homogeneity of a surface or variations of local optical properties of an internal part of a sample, which cannot be obtained by using a conventional scanning microscope scheme. Hereinafter, components of the scanning microscope according to the present invention will be described in detail.

The light source 100 provides a light beam with an arbitrary frequency to the I/Q interferometer. The I/Q-interferometer 110 provides a probe beam, delivers the probe beam to a sample, focuses the probe beam onto the surface of the sample in the reflection geometry or into the inside of the sample in the transmission geometry, collimates the reflected beam or transmitted beam, and send the collimated beam back into the I/Q-interferometer, where the probe beam is mixed with the reference beam and the interference signal is converted into the I- and Q-signal by using either a homodyne or heterodyne I/Q-demodulation scheme. The XY scanner 142 scans the sample in two directions perpendicular to the propagation direction of the probe beam. The scanner driver 160 actuates the XY scanner. The precision motion stage 140 moves the sample in the direction parallel to the propagation direction of the probe beam. The motion stage driver 170 actuates the precision motion stage. The focusing device focuses the probe beam onto the surface or inside of the sample. The collimating device collimates the probe beam reflected from or transmitted through the sample. The computer 150 receives and stores the digitized I- and Q-signal, calculates the phase and amplitude from the I- and Q-data, process data to extract information about the optical and/or physical properties of the sample, and sends commands for actuating motion stages to the corresponding drivers.

Either a homodyne or a heterodyne I/Q-interferometer scheme can be used for the scanning microscope. In the former case, the reference beam and the probe beam have the same frequency, and, in the latter case, the probe beam and the reference beam have the different frequency. In the case of heterodyne scheme, for example, an acousto-optic modulator can be used for generating two beams with different frequencies. A frequency stabilized, dual-polarization, dual-frequency laser can also be used as a light source. A polarizing beam splitter can be used to separate two polarization eigenmodes. The I/Q-interferometer 110 delivers the probe beam to the sample and mixes the returning probe beam from the sample with the reference beam. Depending on the sample, either the reflection geometry or the transmission geometry can be used. The phase and amplitude changes induced on the probe beam can be demodulated by processing the I-signals and Q-signals from the interferometer. In the reflection geometry, phase and amplitude information can be used for acquiring images of the true morphological structure and map of the material inhomogeneity of a sample under test. In the transmission geometry, local variations of the real and imaginary parts of complex refractive indices can be mapped.

The probe beam input/output device 120 couples the probe beam out of the interferometer 110 and couples the reflected or transmitted beam from the sample back into the interferometer 110. A combination of polarizing beam splitter and a quarter-wave plate or a 45° Faraday rotator can be used as the probe beam input/output device 120 in the reflection geometry. In the transmission geometry, a mirror or a set of folding mirrors can be used for redirecting the transmitted beam into the interferometer 100.

The focusing/collimating device 130 focuses the probe beam onto the sample 'X' and collimates the probe beam reflected from or transmitted through the sample X. A single converging lens, or a set of lenses, or a parabolic mirror can be used as a focusing/collimating device 130. The same focusing device can be used as the collimating device in the reflection measurement, while another focusing device must be used in the transmission measurement.

Figure 2:
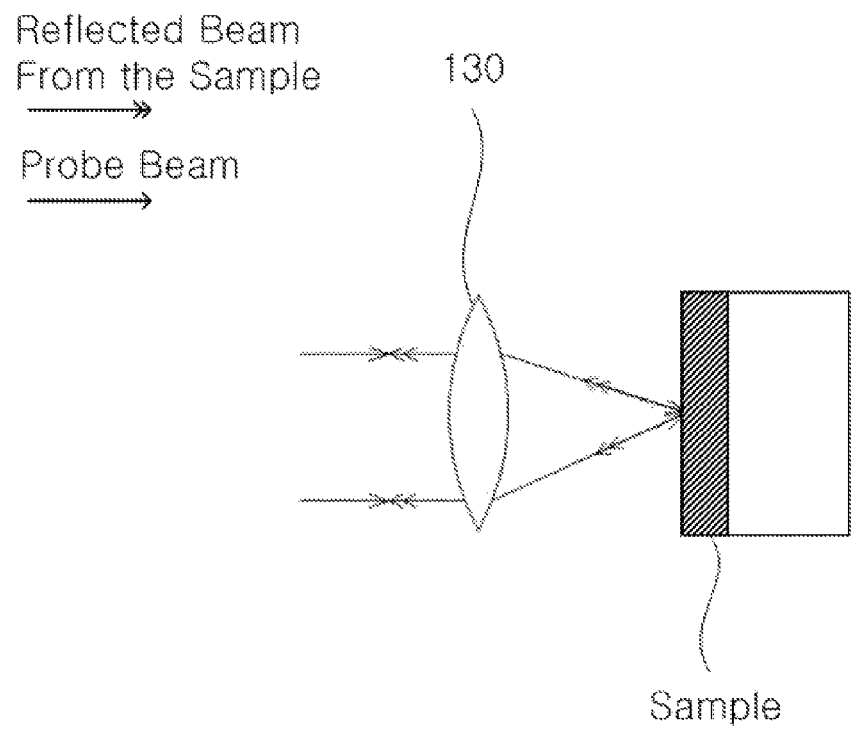
FIG. 2 illustrates exemplary optical arrangement for reflection geometry.

An exemplary embodiment of the reflection geometry is shown in FIG. 2. The probe beam is focused onto the surface of the sample 'X' by using the focusing/collimating device 130 and the reflected beam from the surface is collimated by using the same focusing device 130. The reflected beam is sent back into the I/Q-interferometer where the returning probe beam is mixing with the reference beam. The I- and Q-signal Reflection geometry can be used for diagnosing the surface of a sample under test. For example, height variations of the surface result in the corresponding phase changes in the probe beam while changes in material properties or, equivalently, changes in reflection coefficients induce amplitude changes in the probe beam. The phase and amplitude of the probe beam at one scanning point represent the corresponding height and reflection coefficient of the surface at the scanning point. Therefore, by using maps of the local phase and amplitude changes, true morphology and material inhomogeneities of the surface can be obtained.

Figure 3:
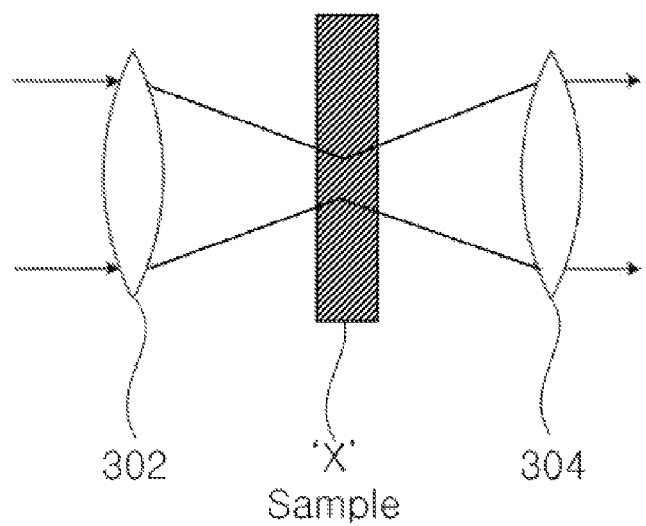
FIG. 3 illustrates exemplary optical arrangement for transmission geometry.

An exemplary embodiment of the transmission geometry is shown in FIG. 3. The probe beam is focused into the region of interests in the sample 'X' and the transmitted beam through the sample is collimated by using a collimating device 304. A mirror or a set of mirrors can be used to redirect the probe beam back into the I/Q-interferometer. Local variations of the real and imaginary parts of the complex refractive index result in the phase and amplitude changes in the probe beam. Therefore, measurements of phase and amplitude changes in the probe beam can provide information about variations of complex refractive indices which is directly related to material properties in the medium.

In the I/Q-interferometer, the probe beam in which the phase and amplitude are modified by the complex properties of the sample is mixed with the reference beam. I- and Q-signals can be extracted from the mixing process by using either a proper optical arrangement (homodyne case) or a RF I/Q-demodulator (heterodyne case). The I- and Q-signals are digitized by using a multichannel A/D converter and stored in a computer 150. The data can be processed in the computer to obtain the corresponding phase and amplitude values.

The computer 150 can also be used for controlling the scanner driver 160. It can give instructions to the scanner driver 160 on the scanning speed, step size, number of scans in X and Y directions, delay at each scanning point, and so forth. The scanning parameters can be stored in the computer and used for calculating the absolute scanning coordinates for plotting the data obtained by the scanning.

Figure 4:
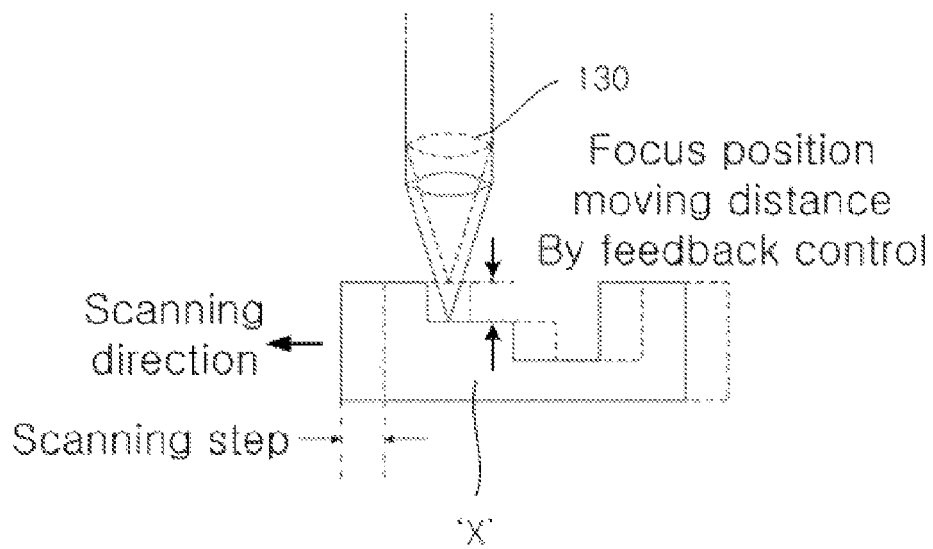
FIG. 4 illustrates a conceptual view for explaining the method of constant height scanning in the scanning microscope according to a first embodiment of the present invention.

According to this invention, the computer 150 is used for calculating the error signal for the feedback control to keep the phase of the probe beam at a constant value during the scanning. In order to obtain the error signal, PI or PID operation on the phase signal is performed in the computer and the resulting error signal is sent to the motion stage driver 170. The precision motion stage moves either the sample or the focusing/collimating device in the Z-direction to compensate for the phase changes caused by height variations during the scanning. Therefore, true topographical structure of the surface can be imaged quantitatively by plotting error signals for the corresponding scan positions. Moreover, since the feedback control keeps the surface at constant height, there is no $2\pi$ ambiguity in phase measurements. Indeed, since the output signal from an I/Q-interferometer is periodic with a periodicity $\pi$, if there is an abrupt phase change larger than multiple of $\pi$ phase difference between two scanning points, the true height cannot be measured. FIG. 4 illustrates the basic concept of the constant phase scanning method.

FIG. 4 is a conceptual view for explaining the process for analyzing the surface structure of the sample by applying the constant phase scanning method to the complex function microscope according to the present invention.

The constant phase scanning is a method that focuses the probe beam into a desired position on the sample and then feedback controls the distance between the focusing device and the sample so that the phase has always a constant value when scanning the sample in the XY directions. A unevenness of the surface having a constant phase can be found from an error signal for the feedback control, and information with respect to reflectivity variation given by material variation can be found from the amplitude signal.

For example, in a micro structure having a three dimensional structure, since the error signal is given by the unevenness of the three dimensional structure, it is possible to figurate the three dimensional shape of the structure from the error signal stored in the computer. At this time, the measured amplitude signal should always have a constant value if the structure has no variation in material. The amplitude signal is varied when impurities are added to the structure and thus the reflectivity coefficient is partially varied, and therefrom, it is possible to diagnose abnormality of the structure. It is also possible to figurate the three dimensional structure of the surface from the error signal when medium consisting the surface is not regular, and it is possible to quantitatively found the heterogeneity of the material according to variation in the magnitude signal. Therefore, it is possible to clearly diagnose the three dimensional structure and material of the surface through this micrometric method.

In the constant phase scanning method, the computer 150 provides an error signal with respect to the feedback control to the micro-distance adjusting device 170 during scanning in reference to a phase value at one position on which the focus is laid so that the phase of the probe beam can always maintain a constant value. The computer can image a geometric three dimensional structure with respect to the sample structure using the error signal for the feedback control, and homogeneity of the medium consisting the sample can be found from the magnitude signal. Since the focus plane of the probe beam is always laid on the surface of the sample during scanning the surface of the sample, it is possible to maintain an optimal resolution.

Second Embodiment

Figure 5:
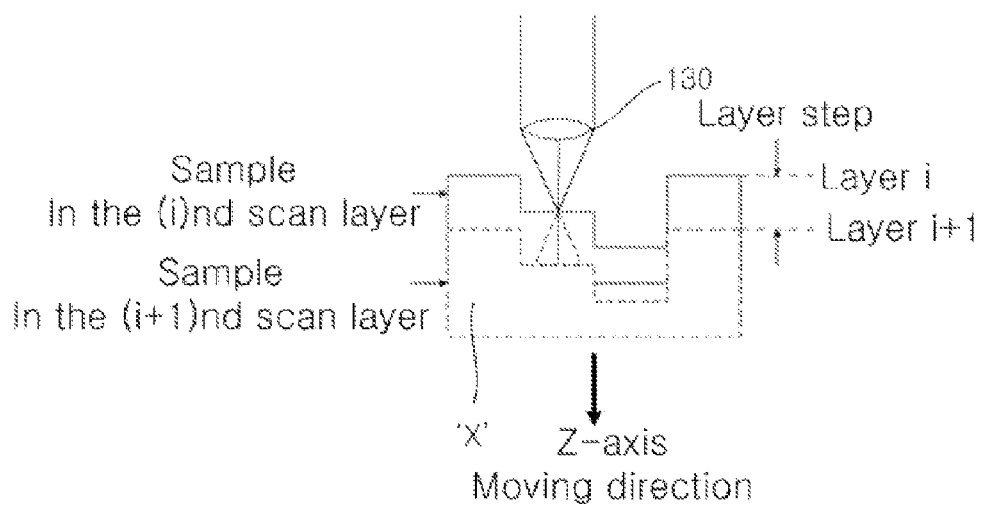
FIG. 5 illustrates a conceptual view for explaining the method of multilayer scanning in the scanning microscope according to a second embodiment of the present invention.
Figure 6:
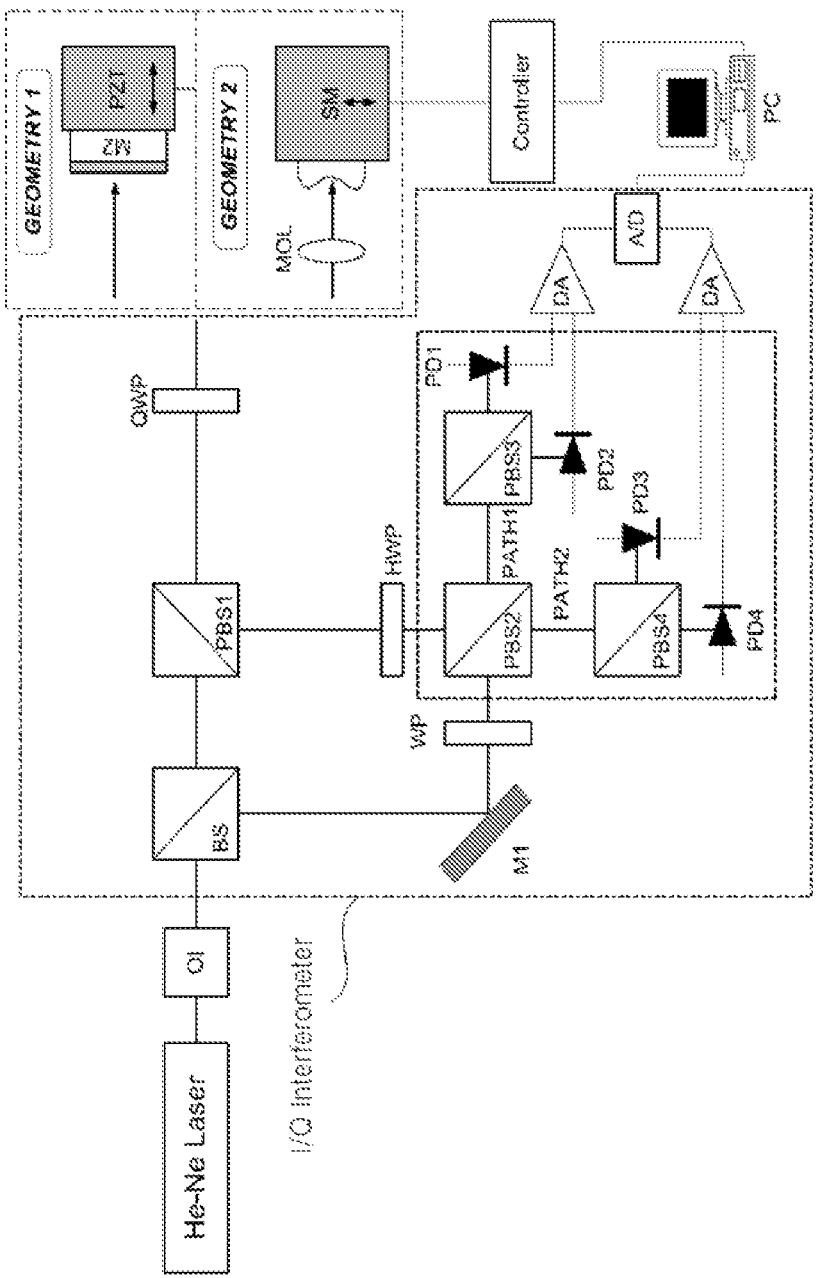
FIG. 6 is an experimental arrangement of a conventional Multiport coherent optical detector.

In the second embodiment of the present invention, multilayer or multi-section scanning method is described. The multilayer scanning method can be applied for imaging either a surface or an inside of the sample. The basic concept of the multilayer scanning method is illustrated in FIG. 5. No active feedback control is required for this passive, layer by layer scanning method. One exemplary embodiment of the multilayer scanning method in the reflection geometry is shown in FIG. 5.

The computer transfers control commands to the scanner driver for moving the XY scanner from one scanning point to a next scanning point in a direction perpendicular to the propagation direction of the probe beam, receives, stores, and processes the I- and Q-signals, demodulates the phase and amplitude changes induced on the probe beam, to complete XY scanning procedure in one layer of the sample. After completion of XY scanning and acquiring data for local phase and amplitude variations in one layer, say the i-th layer, the motion stage driver pushes up or pulls down the sample by a prescribed distance. The computer transfers commands to the motion stage driver for the precision motion stage to move the sample by a prescribed distance in a direction parallel to the propagation direction of the probe beam, performs XY scanning for the new layer of the sample, and continues aforementioned layer by layer scanning procedure up to a prescribed number of layers.

The I/Q-interferometer is scanning over the (i+1)-th layer. Phase and amplitude values at each scanning point are saved in the computer. This procedure can be continued until the number of layers reaches at the prescribe value. True morphology of the surface can be imaged by using multilayer phase measurements. Moreover, if the step size is properly adjusted, $\pi$ ambiguity in I/Q-interferometry can be avoided. In the transmission geometry, phase and amplitude changes are given by local variations of real and imaginary parts of the complex refractive indices which represent material inhomogeneity of the sample.

FIG. 5 is a conceptual diagram for explaining an operation of the complex function microscope for the multilayer scanning according to the present invention.

Referring to FIG. 5, in the multilayer scanning process according to the present embodiment, the sample X is firstly placed on the sample die and the sample die is fixed to a location on Z axis by the up/down lift. After that, values of the phase and the amplitude varied as the location (x, y) are measured by the I/Q interferometer while scanning in XY directions using the XY scanner, and stored in the computer. Next, the up/down lift is transported by one step in z direction to change the location of the sample die on the z axis and then data with respect to the phase and amplitude variations are obtained while scanning again in the XY directions. As such, obtainment of information with respect to the phase and amplitude variations through the XY directional scanning after the z directional transportation is repeatedly carried out, thereby carrying out the scanning with respect to various layers. At this time, a transportation interval and a transportation number may be manually set according to the sample or may be set by an automatic setting function that controls the interval and number through a software while comparing the scanning results on a per layer basis.

The computer receives and stores the signals of the phase and amplitude variations derived in the probe beam from the I/Q interferometer while scanning the sample on a per layer basis. And, it is possible to obtain a map of partial phase variation and amplitude variation with respect to corresponding layer from the stored scanning results on a per layer basis, and it is possible to quantitatively analyze a three dimensional geometric structure and a material distribution of the sample X by synthesizing the scanning results with respect to various layers.

By applying the multilayer scanning technology, it is possible to perform a combined analysis, on a per layer basis, with respect to the structure of a sample surface in the same level as a focus, and it is possible to qualitatively analyze three dimensional structure and material of the sample by synthesizing the analysis results obtained from the respective layers. At this time, an interval between the layers and a number of layer may be manually determined in consideration of a properties of the sample, a depth of focus of a focusing device and the like, or may be automatically determined by comparing variations between the layers using a software.

When performing a surface diagnosis using the multilayer scanning, a position at which the magnitude of the amplitude signal is largest is firstly found in the layer scanning result using the fact that the magnitude of the amplitude signal is largest when the focus is exactly laid on the surface. Next, the positions having the same phase as the position at which the magnitude of the amplitude signal is largest are connected to obtain a contour line or a contour surface with respect to a topography, and it is possible to obtain information with respect to a reflectivity variation due to a heterogeneity of the surface, etc. from the amplitude signal with respect to the contour line or the contour surface. Also, since the positions are always focused, it is possible to analyze the sample with an optimal resolution of the focusing device at the positions.

As described above, the present invention utilizes constant phase scanning method and multilayer scanning method to the scanning microscope. According to the present invention, true images of the morphology and material inhomogeneity of a surface can be obtained in reflection mode, while the imaginary and real part of bulk medium can be obtained. Moreover, $\pi$ ambiguity in I/Q-interferometry can be removed by using this new method. This new technology can be applied for quantitative analysis of a hetero-structure such as bio materials and devices, semiconductor materials and devices, and so forth.

Having described a preferred embodiment of the present invention, it is to be understood that variants and modifications thereof falling within the spirit of the invention may become apparent to those skilled in this art, and the scope of this invention is to be determined by appended claims and their equivalents.

What is claimed is:

1. A scanning microscope using an I/Q-interferometer, comprising:
   an I/Q-interferometer, from which a probe beam is coupled out, to which a reflected beam from a surface or transmitted beam through a sample is coupled back, in which I/Q-demodulation on interference signals are performed, and by which I- and Q-signals are obtained;
   an XY scanner scanning the sample in two directions perpendicular to a propagation direction of the probe beam;
   a scanner driver actuating the XY scanner;
   a precision motion stage controlling the displacement of the sample along the direction parallel to the direction of the probe beam;
   a motion stage driver actuating the precision motion stage;
   a focusing device focusing the probe beam from the I/Q interferometer onto a surface or inside of the sample;
   a collimating device collimating the probe beam reflected from or transmitted through the sample; and a computer transferring control commends to the scanner driver for moving XY scanner from one scanning point to the next scanning point in a direction perpendicular to the propagation direction of the probe beam, receiving, storing, and processing the I- and Q-signals, demodulating phase and amplitude changes induced on the probe beam, wherein the computer measures phase change in each scanning point, calculates an error signal for a feedback control for a constant phase scanning, transfers commends to the motion stage driver for the precision motion stage to compensate for height changes during the constant phase scanning, obtains true morphology of the sample from the error signal, and obtains a map of material inhomogeneity from amplitude measurements, wherein the computer finds out a scanning point, at which an amplitude signal is largest in the scanning result, and connects scanning points which have the same phase as the scanning point with largest amplitude to obtain a contour line or a contour surface.

2. The scanning microscope as set forth in claim 1, wherein the computer obtains material inhomogeneity by mapping amplitude variations along the contour line or the contour surface.

3. The scanning microscope as set forth in claim 1, wherein the probe beam suffers phase variation caused by topography and amplitude variation caused by material inhomogeneity when scanning the surface of the sample.

4. A scanning microscope using an I/Q-interferometer, comprising:

an I/Q-interferometer, from which a probe beam is coupled out, to which a reflected beam from a surface or transmitted beam through a sample is coupled back, in which I/Q-demodulation on interference signals are performed, and by which I- and Q-signals are obtained;

an XY scanner scanning the sample in two directions perpendicular to a propagation direction of the probe beam;

a scanner driver actuating the XY scanner;

a precision motion stage controlling a displacement of the sample along a direction parallel to the propagation direction of the probe beam;

a motion stage driver actuating the precision motion stage;

a focusing device focusing the probe beam from the I/Q interferometer onto a surface or inside of the sample;

a collimating device collimating the probe beam reflected from or transmitted through the sample; and a computer transferring control commends to the scanner driver for moving the XY scanner from one scanning point to a next scanning point in a direction perpendicular to the propagation direction of the probe beam, receiving, storing, and processing the I- and Q-signals, demodulating phase and amplitude changes induced on the probe beam, to complete XY scanning procedure in one layer of the sample;

wherein, after the completion of the XY scanning in one layer of the sample, the computer transfers commends to the motion stage driver for the precision motion stage to move the sample by a prescribed distance in a direction parallel to the propagation direction of the probe beam, performs XY scanning for the new layer of the sample, and continues aforementioned layer by layer scanning procedure up to a prescribed number of layers, wherein the computer finds out a scanning point, at which an amplitude signal is largest in the scanning result, and connects scanning points which have the same phase as the scanning point with largest amplitude to obtain a contour line or a contour surface.

5. The scanning microscope as set forth in claim 4, wherein the computer obtains material inhomogeneity by mapping amplitude variations along the contour line or the contour surface.

6. The scanning microscope as set forth in claim 4, wherein the probe beam suffers phase variation caused by topography and amplitude variation caused by material inhomogeneity when scanning the surface of the sample.

* * * * *